(12) United States Patent
Erdman et al.

(10) Patent No.: US 7,318,751 B2
(45) Date of Patent: Jan. 15, 2008

(54) DIE-CAST ADAPTER

(75) Inventors: David D. Erdman, Hummelstown, PA (US); Douglas H. Rohde, York, PA (US); Robert C. Briggs, Newport, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/330,495

(22) Filed: Jan. 11, 2006

(65) Prior Publication Data

US 2006/0154529 A1    Jul. 13, 2006

Related U.S. Application Data

(60) Provisional application No. 60/643,641, filed on Jan. 13, 2005.

(51) Int. Cl.
*H01R 25/00* (2006.01)
(52) U.S. Cl. .......................................... 439/654; 385/93
(58) Field of Classification Search ............ 385/58–76, 385/92–93; 439/654
See application file for complete search history.

(56) References Cited

U.S. PATENT DOCUMENTS

| | | | | |
|---|---|---|---|---|
| 4,840,451 A * | 6/1989 | Sampson et al. | ............. | 385/89 |
| 5,062,808 A * | 11/1991 | Hosler, Sr. | ............. | 439/580 |
| 5,233,674 A * | 8/1993 | Vladic | ............. | 385/56 |
| 5,317,663 A * | 5/1994 | Beard et al. | ............. | 385/70 |
| 5,546,490 A * | 8/1996 | Kikuchi et al. | ............. | 385/93 |
| 5,647,043 A * | 7/1997 | Anderson et al. | ............. | 385/78 |
| 5,719,977 A * | 2/1998 | Lampert et al. | ............. | 385/60 |
| 5,781,680 A * | 7/1998 | Womack et al. | ............. | 385/53 |
| 6,027,252 A | 2/2000 | Erdman et al. | ............. | 385/76 |
| 6,206,579 B1 * | 3/2001 | Selfridge et al. | ............. | 385/60 |
| 6,357,929 B1 * | 3/2002 | Roehrs et al. | ............. | 385/59 |
| 6,461,055 B1 * | 10/2002 | Zimmel | ............. | 385/73 |
| 6,543,941 B1 * | 4/2003 | Lampert | ............. | 385/58 |
| 6,550,978 B2 * | 4/2003 | De Marchi | ............. | 385/60 |
| 6,554,484 B2 * | 4/2003 | Lampert et al. | ............. | 385/70 |
| 6,572,272 B2 * | 6/2003 | Ngo | ............. | 385/53 |
| 6,599,024 B2 * | 7/2003 | Zimmel | ............. | 385/73 |
| 6,783,281 B2 * | 8/2004 | Cheng | ............. | 385/55 |
| 6,863,446 B2 * | 3/2005 | Ngo | ............. | 385/72 |
| 6,872,008 B2 * | 3/2005 | Takeda et al. | ............. | 385/60 |
| 6,891,735 B2 * | 5/2005 | Hultermans et al. | ........ | 361/800 |
| 2002/0181888 A1 * | 12/2002 | Zimmel | ............. | 385/72 |
| 2006/0140545 A1 * | 6/2006 | Takeda et al. | ............. | 385/60 |

* cited by examiner

*Primary Examiner*—Briggitte R. Hammond
*Assistant Examiner*—Larisa Tsukerman

(57) ABSTRACT

An adapter includes an integrally-molded metal housing defining a first port axially aligned with a second port, each adapted to receive an optical connector plug having a cylindrical ferrule. A junction portion defines a cylindrical axial passage between the ports and has a first end adjacent the first port and a second end adjacent the second port. The first end of the junction portion has a ridge portion extending inwardly, thereby restricting a diameter of the passage at the first end. An alignment sleeve is disposed in the passage, the alignment sleeve having a diameter suitable for receiving a ferrule of each optical connector plug and axially aligning the ferrules to effect optical coupling of fibers contained in the ferrules. An end cap is disposed at the second end and is engaged with the junction portion to restrict the diameter of the passage at the second end, thereby securing the sleeve in the passage.

15 Claims, 2 Drawing Sheets

DIE-CAST ADAPTER

CROSS-REFERENCE TO RELATED APPLICATION

This application claims the benefit of U.S. Provisional Application No. 60/643,641 filed Jan. 13, 2005.

FIELD OF THE INVENTION

This invention relates generally to the field of optical connectors, and, more specifically, to plug-receiving adapters which are robust and provide EMI protection.

BACKGROUND OF THE INVENTION

In the optical fiber field, there is a need to connect the optical transmission path of a fiber to that of another fiber. Often this connection is effected by terminating each fiber end with an optical plug and then inserting both plugs into an adapter. A plug typically comprises a housing which contains a ferrule or other means for holding and precisely positioning one or more fiber ends. An adapter generally comprises a housing having two ports, each configured to receive and hold the housing of a plug and to facilitate optical connection of each plug with the other. For purposes of discussion herein, when the plug is inserted in the adapter, the adapter and plug are referred to as "mated." Likewise, when the plug is not inserted in the adapter, the adapter and plug are referred to as "unmated." Adapters may have various configurations (e.g., simplex, duplex and quad) for use in various applications (e.g., backplane and through-chassis interconnections).

A recent trend in optical connectors, and in telecommunication interconnects generally, is to miniaturize backplanes, chassis, and other routing apparatus by increasing "port density." Increasing port density facilitates miniaturization as it allows a high number of interconnections to be made in a small space. To this end, the industry has moved to a "small form factor" design for its connectors in which the space or area that the connector occupies in the plane orthogonal to the optical axis (herein "panel area") is minimized. The current understanding behind the term "small form factor" when referring to an adapter design is a design in which the duplex embodiment occupies the same panel area as a traditional SC adapter. A traditional SC adapter is well known in the art. Examples of connector systems which offer the small form factor adapters include the LC connector system, the MU connector system, and the MTT connector system.

Although small form factor connector systems have enjoyed tremendous success in recent years, applicants have discovered a number of shortcomings. Specifically, applicants observed that when small form factor adapters, such as the LC adapter, are configured to fit in the SC panel cutout, the walls of the adapter tend to be very thin. These thin walls present strength problems, particularly when side loads are applied to the cable assemblies inserted in the adapter. Additionally, as operating frequencies increase, so do the problems associated with electromagnetic interference (EMI). Although optics are immune from EMI with respect to both being influenced by EMI and generating EMI, it has been noted that gaps between the adapter and the panel in the panel cutout are often culprits in allowing EMI generated by other components to escape from the panel. To remedy this situation, a number of approaches have been employed. Specifically, conductive seals and other "EMI gasketing" are often placed between the adapter and the panel. More recently, metal inserts have been placed in plastic adapters to block EMI. Although these approaches have provided some control over EMI, they tend to be expensive to implement and burden those installing the equipment which is generally discouraged. Therefore, there is a need for a small form factor adapter which provides adequate side load strength and which dampens EMI. Applicants recognize that this need could be met with a metal small form factor adapter.

Although a metal small form factor adapter is desirable, applicants have found that conventional approaches for producing such an adapter tend to be inadequate. Specifically, a critical aspect of the adapter is the cylindrical sleeve it contains. The sleeve serves to receive and align the ferrules of the plugs inserted into the adapter. This component requires precision to a degree not yet realized in die case molding. Therefore, it is generally recognized, that a metal adapter must, in some way, contain a discrete cylindrical alignment sleeve. Most prior art approaches therefore employ a two component design, in which the sleeve is placed between the components and the components are then joined by rivets or screws Although such an approach has been found to, work, the multi-component nature of the design complicates manufacturing and increases inventory requirements. Additionally, since the two halves must be joined together, alignment is required, which, at the level of precision required for a small form factor connector system, can be onerous. Thus, these prior art techniques tend to increase manufacturing time, scrap, and ultimately cost.

Aside from these conventional approaches, applicants have attempted to adapt the manufacturing process disclosed in U.S. Pat. No. 6,027,252 for small from factor adapter design. Although this design has proven very effective in SC adapter manufacturing, the small form factor aspects considered herein render this approach less than desirable. Specifically, this approach requires molds that facilitate a slot on the side to receive a fork for pinning the various components within the adapter. Such molds tend to be particularly complex. Although this complexity may be warranted if other components, like a compliant latch for securing the plug, are also incorporated into the integrally-molded adapter (as shown in U.S. Pat. No. 6,027,252), they are overly complex for the connector systems considered herein. For example, the adapter design for an LC connector is simple since the compliant latching mechanism is located on the plug and not the adapter. Thus, the capabilities and flexibility offered in U.S. Pat. No. 6,027,252 are not optimized in a small form factor adapter such as the LC connector.

Therefore, there is a need for a small form factor adapter which is metallic, but which is simple and inexpensive to manufacture. The present invention fulfills this need among others.

SUMMARY OF THE INVENTION

The present invention provides for a small form factor metal adapter which is integrally molded, easily manufactured and robust. Specifically, the adapter is die-cast as a single component and contains an alignment sleeve which is held in place by an end cap. The end cap not only holds the alignment sleeve within the adapter, but also functions as a lead-in. That is, the interior surface of the end cap is precisely formed to act as lead-in surface to guide a ferrule of plug into the alignment sleeve. By segregating the function of the lead-in to the end cap, which is a discreet component, high precision can be realized. Specifically, the end cap is prepared separately from the integrally molded adapter and can even be formed from a different material to optimize its use as both a stop and a lead-in. In one preferred embodiment, a portion of the adapter housing is formed over the end cap to secure it in place. This approach is particularly advantageous since the housing, which is not critically dimensioned, is deformed over the end cap, rather than having the cap deformed to secure to the housing.

Accordingly, one aspect of the invention is an adapter having an integrally molded housing and an end cap to secure the alignment sleeve to the housing. In a preferred embodiment, the adapter comprises: (a) integrally-molded metal housing defining a first port axially aligned with a second port, each adapted to receive a respective optical connector plug having a cylindrical ferrule, and a junction portion between the ports having a first end adjacent the first port and a second end adjacent the second port, the junction portion defining a cylindrical axial passage between the first and second ports, the first end of the junction portion having a ridge portion extending inwardly, thereby restricting the diameter of the passage at the first end; (b) an alignment sleeve disposed in the passage, the alignment sleeve having a diameter suitable for receiving the ferrule of each optical connector plug and axially aligning the ferrules to effect optical coupling of the fibers they contained in the ferrules; (c) an end cap disposed at the second end and engaged with the junction portion to restrict the diameter of the passage at the second end, thereby securing the alignment sleeve in the passage.

Another aspect of the invention is a method for manufacturing the adapter in which the adapter housing is die-cast and then the sleeve and cap are subsequently integrated. In a preferred embodiment, the method comprises the steps of: (a) die casting a metal housing, the housing defining a first port and a second port axially aligned and each adapted to receive an optical connector plug having a cylindrical ferrule, and a junction portion between the ports having a first end adjacent the first port and a second end adjacent the second port, the junction portion defining a cylindrical axial passage between the first and second ports to receive the ferrule of each plug, the first end of the junction portion having ridge portion extending inwardly, thereby restricting the diameter of the passage at the first end; (b) inserting an alignment sleeve in the passage through the second end of the junction member; (c) disposing an end cap at the second end of the junction member; and (d) deforming a portion of the second end to roll over the end cap to secure the end cap and the alignment sleeve in the passage.

DETAILED DESCRIPTION OF THE PREFERRED EMBODIMENT

Figure 1:
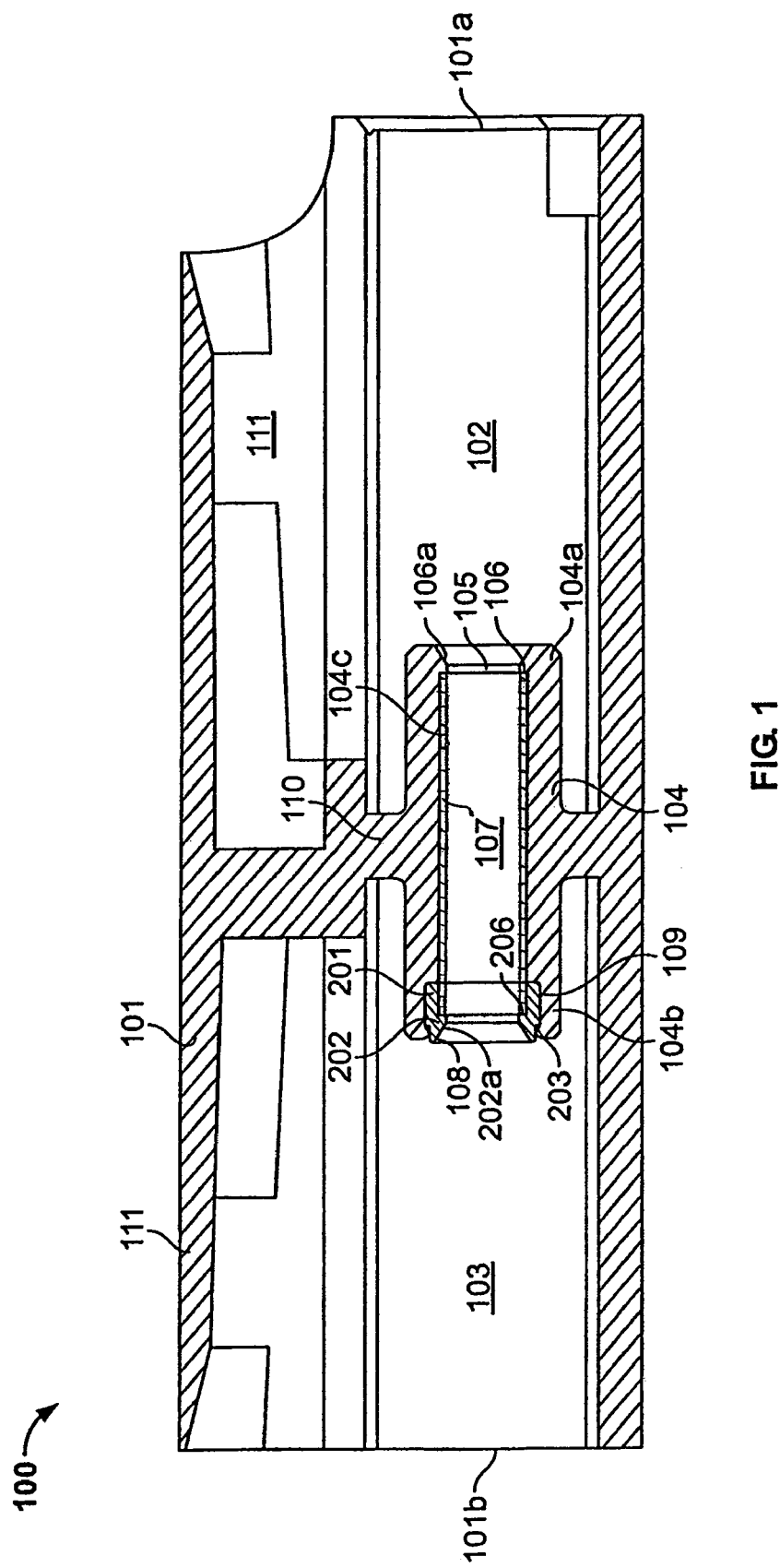
FIG. 1 is a cross-sectional view of an adapter according to the invention.

Referring to FIG. 1, an adapter 100 of the present invention is shown. The adapter 100 comprises an integrally-molded metal housing 101 defining a first port 102 and a second port 103 axially aligned and each adapted to receive an optical connector plug having a cylindrical ferrule. The housing 101 has a junction portion 104 between the ports 102, 103, and has a first end 104*a* adjacent the first port 102 and a second end 104*b* adjacent the second port 103. The junction portion 104 defines a cylindrical axial passage 105 between the first and second ports to receive the ferrule of each plug. The first end 104*a* of the junction portion 104 has a ridge portion 106 extending inwardly, thereby restricting the diameter of the passage 105 at the first end 104*a* In the passage 105 is an alignment sleeve 107. The alignment sleeve 107 has an internal diameter suitable for receiving a ferrule of each optical plug and axially aligning the plugs to effect the optical coupling of the fibers they contain. Disposed at the second end 104*b* of the passage 105 is an end cap 108. End cap 108 is engaged with the junction portion 104 and restricts the diameter of the passage 105 at the second end 104*b* to secure the sleeve 107 in the passage 105. Each of these components and their assembly is considered in greater detail below.

Figure 3:
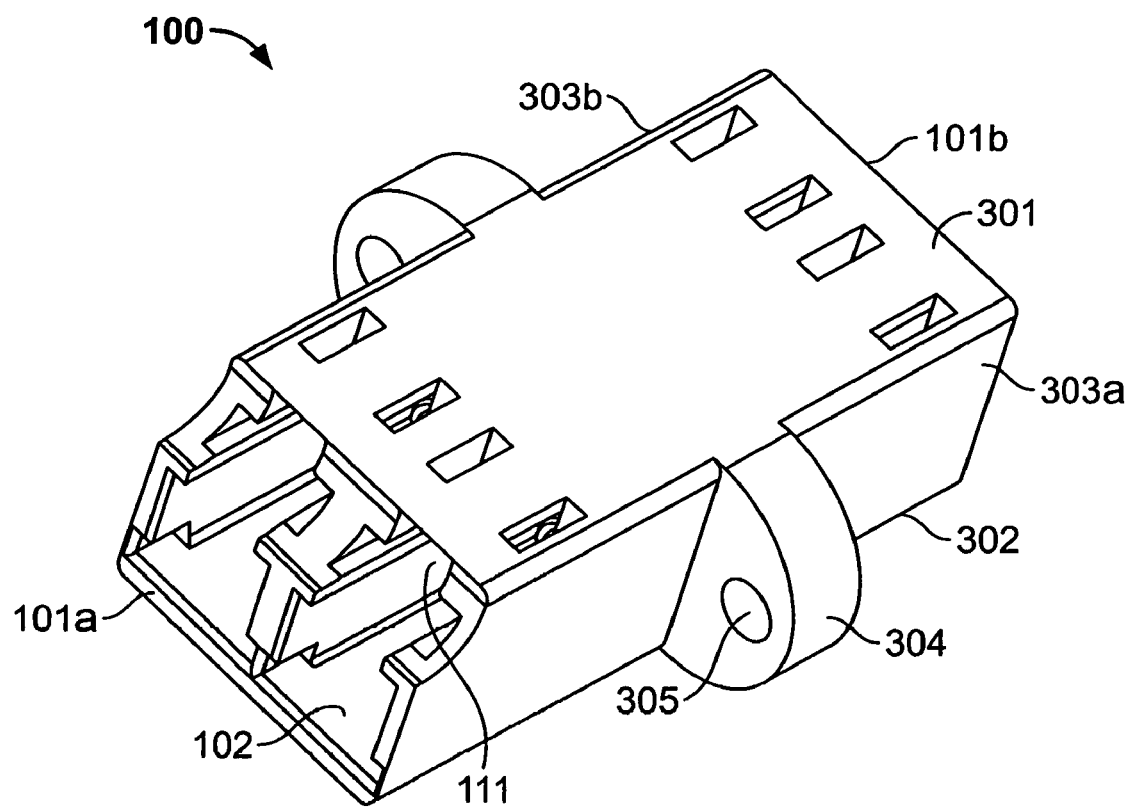
FIG. 3 is a perspective view of the adapter shown in FIG. 1.

Referring to FIGS. 1 and 3, the housing 101 of the adapter 100 of the present invention will be considered in greater detail. The primary function of the housing is to receive and hold the plugs and to align their respective ferrules and the fibers contained therein. To this end, the housing 101 defines first and second ports 102, 103 for receiving the plugs (not shown). Referring to FIG. 3, for example, the latch of the plug may be received in cavity 111. This is a well known connection mechanism and is not discussed in detail herein.

To align the ferrules of the plugs, the housing 101 comprises a junction portion 104 disposed between the first and second ports 102, 103. The junction portion 104 is cylindrically shaped and defines a passage 105 sized to receive the alignment sleeve 107. The junction portion 104 has first and second ends 104*a*, 104*b* and comprises a flange 110 which serves to attach the connection portion 104 to the rest of the housing 101. The first end 104*a* of the junction portion 104 comprises a ridge portion 106.

The ridge portion 106 serves two purposes. First, it serves as a stop to prevent the alignment sleeve 107 from exiting the junction portion 104 through the first end 104*a*. Second, the ridge portion 106 comprises a lead-in portion 106*a* which serves to guide the ferrule of the plug into the alignment sleeve 107. The function and configuration of the lead-in portion 106*a* are well known in the art and are not discussed in detail herein. Suffice it to say that lead-in portions are precisely dimensioned, conically shaped surfaces which must be wide enough at one end to "capture" the ferrule and narrow enough at another end to channel the ferrule into the alignment sleeve 107.

Referring to the second end 104*b* of the junction portion 104, it is obvious that a structure similar to the ridge portion 106 is not present. To the contrary, rather than the ridge portion 106, the second end 104*b* defines an annular recess 109 adapted to receive the end cap 108. Thus, prior to the placement of the end cap 108 in the annular recess 109, the second end 104*b* of the junction portion 104 defines an opening sufficient to receive the alignment sleeve 107.

The alignment sleeve 107 is preferably the same alignment sleeve used in the standard adapters of the respective connector systems. That is, the present invention places no requirements on the configuration of the alignment sleeve 107, thereby allowing standard alignment sleeves to be used in the present invention. This is yet another benefit of the present invention as it reduces inventory requirements, thereby reducing costs.

Figure 2:
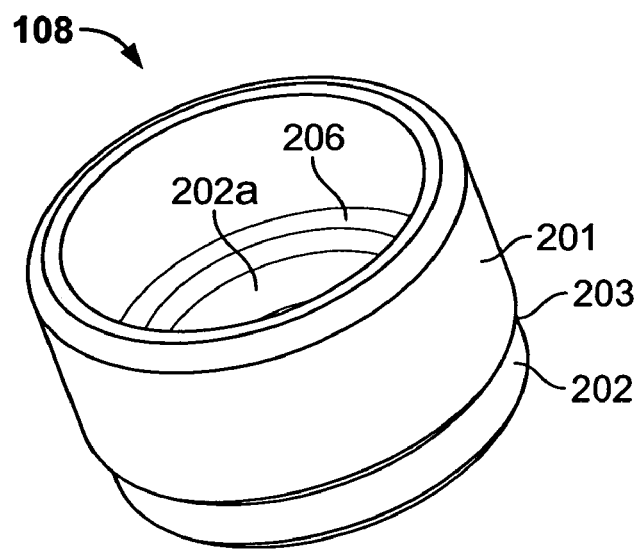
FIG. 2 is a perspective view of an end cap used in the adapter shown in FIG. 1.

The alignment sleeve 107 is held within a bore 104*c* of the junction portion 104 by end cap 108. Referring to FIG. 2, a perspective view of the end cap 108 is shown. The end cap 108 comprises a wall portion 201, a lead-in portion 202, an annular lip 203, and a ridge portion 206. Referring back to FIG. 1, the wall portion is configured to be received in annular recess 109. The lead-in portion 202 comprises a lead-in surface 202a which serves the same function as the lead-in surface 106a described above. In fact, in a preferred embodiment, the geometry of lead-in surface 202a is the same as that of lead-in surface 106a. The ridge portion 206 protrudes inwardly to thereby reduce the diameter of the passage 105 of the junction portion 104, thereby holding the alignment sleeve 107 in place. Therefore, the end cap not only serves to hold the alignment sleeve in place, but also guides the ferrule of the plug into the alignment sleeve.

The function of the lip 203 is to engage a portion of the second end 104b of the junction portion 104 to secure the end cap 108 in place. In a preferred embodiment, this inter-engagement is effected by "rolling" or otherwise deforming a portion of the second end 104b over the lip 203 once the alignment sleeve 107 and the end cap 108 are disposed within the junction portion 104. By rolling or deforming the second end 104b, a protrusion (not shown) of the second end 104b envelops the lip 203, and prevents withdrawal of the end cap 108 from the junction portion 104.

Although deforming the junction portion 104 around the end cap 108 is preferred, other embodiments of the present invention are possible. For example, the end cap 108 could be provided with compliant components which engage features of the second end 104b to hold the end cap 108 in place. Although possible, this approach is not preferred since it has been found that the alignment and geometry of the lead-in surface 202a is critical and any deformation that is required to secure the end cap to the junction portion 104 should be performed preferably on the junction portion 104, which has dimensions that are less critical than lead-in 202a, rather than the end cap.

In the preferred embodiment, end cap 108 is preferably formed of a material which is rugged and strong. A strong material is preferred since it must withstand the force of having a portion of the second end 104b deformed around it. Suitable materials include, for example, steel, aluminum, high strength polymers, and composite materials such as graphic reinforced polymers. Preferably, the material is steel, and even more preferably, the material is stainless steel. The housing 101 can be formed of any known material which is capable of being die-cast. Suitable materials include, for example, steel, zinc, aluminum, copper, or known alloys. Preferably, the material is zinc due to its common and well known use in die-casting applications.

The adapter configuration of the present invention is suitable for a variety of applications and can be formed in a number of configurations. Referring to FIG. 3, the adapter is preferably rectilinear, having a top wall 301, a bottom wall 302, and side walls 303a and 303b. (It should be understood that references to top and bottom made herein are done for illustrative purposes and are not intended to restrict the scope of the invention. Indeed, it is anticipated that the adapter could be inverted so that what is referred to herein as the top wall 301 could actually be on the bottom.) This particular embodiment is a duplex LC connector which is suitable to fit in an SC cutout. Although the adapter of the present invention is particularly suited for duplex adapters for SC cutouts due to the increased side wall strength, the invention is not limited to such configurations. For example, the present invention can be practiced with simplex, duplex, and quad small form factor adapters.

As shown in FIG. 3, the adapter 100 comprises ears 304 on either side to facilitate its connection to a panel end face. These ears 304 define fastener holes 305 to receive a fastener for securing the adapter 100 to the panel face plate. Such ears 304 are well known in the art.

In another preferred embodiment, the adapter 100 comprises a flange (not shown) which extends around the perimeter of the housing 101 orthogonal to the optical axis of the plugs. Such an embodiment is preferred for EMI reduction purposes. Specifically, the flange serves to cover the gap between the walls of the adapter and the perimeter of the cutout in the panel face plate. In a preferred embodiment, the flange is used in combination with a clip on end 101b of housing 101. Specifically, the clip has resilient members which deform inwardly as the adapter 100 is inserted into the panel cutout and then spring outwardly once their flee ends have cleared the edge of the panel cutout. The result is that the panel is sandwiched between the flange and the resilient members of the clip to hold the adapter in the panel. Such a clip mechanism is known in the art.

The present invention also entails a process for assembling the components described above. In a preferred embodiment, the method of assembly comprises first die casting a metal housing 101 as described above. After the housing is cast, an alignment sleeve is inserted in the passage through the second end of the junction member. To retain the alignment sleeve within the junction portion, the end cap 108 is disposed at the second end 104b of the junction member 104. Finally, to secure the end cap in place, a portion of the second end is deformed or "rolled" over the end cap to secure the end cap and the alignment sleeve in the passage. These steps are considered in greater detail below.

With respect to step (a), in a preferred embodiment, the passage in the junction member is formed using a single core pin. This approach results in a unitary passage, free from seems and alignment issues. Such a feature is highly desirable in the junction portion since precision here is critical to effect the optical coupling between plugs. Furthermore, besides using a single core pin, the simplicity of the adapter of the present invention also facilitates the use of simple molds, allowing the casting to be performed with just two components which separate axially to effect the release of the adapter.

Preferably, step (d) is performed using an arbor press. The arbor press preferably comprises a conically tapered bore which urges against the second end 104b during the pressing operation to deform it annularly inward to produce the protrusion that abuts against the ridge 203 of the end cap 108 to hold the end cap 108 within the passage 105.

What is claimed is:

1. An adapter for effecting mating of two plugs, said adapter comprising:

an integrally-molded metal housing defining a first port axially aligned with a second port, each of said ports adapted to receive a respective optical connector plug having a cylindrical ferrule, and a junction portion between the ports having a first end adjacent said first port and a second end adjacent said second port, said junction portion defining a cylindrical axial passage between said first and second ports, said first end of said junction portion having a ridge portion extending inwardly, thereby restricting a diameter of said passage at said first end;

an alignment sleeve disposed in said passage, said alignment sleeve having an internal diameter suitable for receiving said ferrule of each said optical connector plug and axially aligning said ferrules to effect optical coupling of fibers contained in said ferrules; and an end cap disposed at said second end and engaged with said junction portion to restrict the diameter of said passage at said second end, a portion of said second end of said junction portion protruding inwardly to hold said end cap, thereby securing said alignment sleeve in said passage.

2. The adapter of claim 1, wherein said end cap includes an outer surface having a lip that receives a protrusion of said second end to hold the end cap to the junction portion.

3. The adapter of claim 1, wherein said housing is dimensioned to fit in an SC cutout of a panel.

4. The adapter of claim 1, wherein said housing has top, bottom and sides walls, an ear extends from each of the side walls, and each said ear has a hole for receiving a fastener.

5. The adapter of claim 1, wherein said metal is zinc.

6. The process of claim 1, wherein, in step (a), said metal is zinc.

7. The adapter of claim 1, wherein said ridge portion comprises a lead-in portion to guide said ferrule into said alignment sleeve.

8. The adapter of claim 7, wherein said end cap comprises a lead-in portion that is configured identical to said lead-in portion on said first end of said junction portion.

9. An adapter for effecting mating of two plugs, said adapter comprising:
   an integrally-molded metal housing defining a first port axially aligned with a second port, each of said ports adapted to receive a respective optical connector plug having a cylindrical ferrule, and a junction portion between the ports having a first end adjacent said first port and a second end adjacent said second port, said junction portion defining a cylindrical axial passage between said first and second ports, and defining an outer surface and an inner surface, said passage being defined by said inner surface, and said inner surface at said second end defining an annular recess, said first end of said junction portion having a ridge portion extending inwardly, thereby restricting a diameter of said passage at said first end;
   an alignment sleeve disposed in said passage, said alignment sleeve having an internal diameter suitable for receiving said ferrule of each said optical connector plug and axially aligning said ferrules to effect optical coupling of fibers contained in said ferrules; and
   an end cap having a wall portion in said annular recess to restrict the diameter of said passage at said second end, thereby securing said alignment sleeve in said passage, and wherein said second end of said junction portion is formed over said end cap.

10. A process for making an adapter comprising the steps of:
   (a) die casting a metal housing, said housing defining a first port and a second port axially aligned and each adapted to receive an optical connector plug having a cylindrical ferrule, and a junction portion between the ports having a first end adjacent said first port and a second end adjacent said second port, said junction portion defining a cylindrical axial passage between said first and second ports to receive said ferrule of each said plug, said first end of said junction portion having ridge portion extending inwardly, thereby restricting a diameter of said passage at said first end;
   (b) inserting an alignment sleeve in said passage through said second end of said junction member;
   (c) disposing an end cap at said second end of said junction member to restrict the diameter of said passage at said second end; and
   (d) deforming a portion of said second end annularly and inwardly to roll over said end cap to secure said end cap and said alignment sleeve in said passage.

11. The process of claim 10, wherein, in step (a), said passage in said junction member is formed using a single core pin.

12. The process of claim 10, wherein, in step (a), a mold is used comprising only two components which separate axially to release.

13. The process of claim 10, wherein step (d) is performed using an arbor press.

14. The process of claim 13, wherein, in step (d) a conically tapered bore on said arbor press is used to deform said second end of said junction member annularly and inwardly.

15. The process of claim 14, wherein, herein steps (b)-(d) are performed with said first end up.

* * * * *